United States Patent
Date et al.

(10) Patent No.: US 10,670,029 B2
(45) Date of Patent: Jun. 2, 2020

(54) MULTI-SEGMENT TURBOCHARGER BEARING HOUSING AND METHODS THEREFOR

(71) Applicant: BorgWarner Inc., Auburn Hills, MI (US)

(72) Inventors: Aaron Date, Asheville, NC (US); Augustine Cavagnaro, Flat Rock, NC (US); Michael Bucking, Asheville, NC (US)

(73) Assignee: BORGWARNER INC., Auburn Hills, MI (US)

( * ) Notice: Subject to any disclaimer, the term of this patent is extended or adjusted under 35 U.S.C. 154(b) by 182 days.

(21) Appl. No.: 15/692,987

(22) Filed: Aug. 31, 2017

(65) Prior Publication Data

US 2018/0023583 A1     Jan. 25, 2018

Related U.S. Application Data

(62) Division of application No. 14/378,981, filed as application No. PCT/US2013/025518 on Feb. 11, 2013, now abandoned.
(Continued)

(51) Int. Cl.
*F04D 29/056* (2006.01)
*F04D 29/063* (2006.01)
(Continued)

(52) U.S. Cl.
CPC ........... *F04D 29/056* (2013.01); *F01D 25/16* (2013.01); *F01D 25/162* (2013.01); *F01D 25/18* (2013.01);
(Continued)

(58) Field of Classification Search
CPC .... F04D 29/056; F04D 29/063; F04D 29/403; F04D 25/045; F16C 35/042;
(Continued)

(56) References Cited

U.S. PATENT DOCUMENTS 2,860,827 A    11/1958  Egli
4,253,031 A     2/1981  Frister
(Continued)

FOREIGN PATENT DOCUMENTS

CN    1912364 A    2/2007
CN  101506489 A    8/2009
(Continued)

OTHER PUBLICATIONS

Chinese Patent Application No. 201280062642.3, Office Action, 17 pages, dated Nov. 3, 2015.
(Continued)

*Primary Examiner* — John C Hong
(74) *Attorney, Agent, or Firm* — Perkins Coie LLP (57) ABSTRACT

A method for enclosing a rotating assembly of a turbocharger including providing at least two bearing housing segments which together form a bearing housing including a bearing bore and an insert bore. The method can include machining complementary mating faces of the segments, machining features as required for alignment and fastening of the segments to each other, machining the bearing bore and the insert bore, and machining oil feed passages and oil drain features into at least one segment. The at least one oil feed bore is drilled from the radially inner surface of the corresponding bearing housing segment. The method can further include balancing a rotating assembly, installing the rotating assembly into one of the bearing housing segments, and joining the segments together to enclose the rotating assembly.

17 Claims, 9 Drawing Sheets

Related U.S. Application Data (60) Provisional application No. 61/600,399, filed on Feb. 17, 2012.

(51) Int. Cl.

| | | |
|---|---|---|
| *F04D 25/04* | (2006.01) | |
| *F04D 29/40* | (2006.01) | |
| *F01D 25/16* | (2006.01) | |
| *F01D 25/24* | (2006.01) | |
| *F01D 25/18* | (2006.01) | |
| *F16C 35/04* | (2006.01) | |

(52) U.S. Cl.
CPC ......... *F01D 25/243* (2013.01); *F04D 25/045* (2013.01); *F04D 29/063* (2013.01); *F04D 29/403* (2013.01); *F16C 35/042* (2013.01); *F05D 2220/40* (2013.01); *F05D 2220/76* (2013.01); *Y10T 29/49325* (2015.01)

(58) Field of Classification Search
CPC ...... F01D 25/162; F01D 25/243; F01D 25/18; F01D 25/16; Y10T 29/49325; F05D 2220/76; F05D 2220/40
See application file for complete search history.

(56) References Cited

U.S. PATENT DOCUMENTS

| | | | |
|---|---|---|---|
| 4,392,752 A | 7/1983 | Shimizu et al. | |
| 5,605,045 A | 2/1997 | Halimi et al. | |
| 5,904,471 A | 5/1999 | Woollenweber et al. | |
| 6,425,743 B1 | 7/2002 | Fischer | |
| 6,449,950 B1* | 9/2002 | Allen ................... F01D 25/166 | |
| | | | 417/407 |
| 6,845,617 B1 | 1/2005 | Allen et al. | |
| 7,360,361 B2 | 4/2008 | Prusinski et al. | |
| 7,469,689 B1 | 12/2008 | Jones et al. | |
| 2002/0076336 A1 | 6/2002 | Mruk et al. | |
| 2004/0200215 A1 | 10/2004 | Woollenweber et al. | |
| 2005/0082941 A1 | 4/2005 | Iida et al. | |
| 2006/0225419 A1 | 10/2006 | Prusinski et al. | |
| 2010/0175377 A1 | 7/2010 | Hippen et al. | |
| 2010/0247342 A1 | 9/2010 | Shimizu et al. | |
| 2010/0247343 A1 | 9/2010 | Shimizu et al. | |
| 2010/0284824 A1 | 11/2010 | Hippen et al. | |
| 2011/0103948 A1 | 5/2011 | Kuzi et al. | |
| 2011/0203271 A1* | 8/2011 | Spooner ................ F01D 15/10 | |
| | | | 60/607 |
| 2012/0269620 A1 | 10/2012 | Boening et al. | |
| 2012/0288367 A1* | 11/2012 | Boening ................ F01D 25/14 | |
| | | | 415/213.1 |
| 2012/0321455 A1 | 12/2012 | Boening et al. | |
| 2014/0373532 A1 | 12/2014 | Diemer et al. | |
| 2015/0285263 A1 | 10/2015 | Bucking | |

FOREIGN PATENT DOCUMENTS

| | | |
|---|---|---|
| CN | 104040145 A | 9/2014 |
| EP | 1273765 B1 | 9/2009 |
| JP | 2000-130176 A | 5/2000 |
| JP | 2000145468 A | 5/2000 |
| JP | 2005120927 A | 5/2005 |
| JP | 2009013966 A | 1/2009 |
| KR | 20010007143 A | 1/2001 |
| WO | WO-2010081123 A1 | 7/2010 |
| WO | WO-2011057945 A1 | 5/2011 |
| WO | WO-2011058104 A2 | 5/2011 |

OTHER PUBLICATIONS

Chinese Patent Application No. 201380007628.8, Office Action, 20 pages, dated Dec. 9, 2015.
Chinese Patent Application No. 201380007656.X, Office Action, 22 pages, dated Dec. 10, 2015.
Chinese Patent Application No. 201380007656.X, Office Action, 24 pages, dated Jul. 18, 2016.
Chinese Patent Application No. 2012800626242.3, Office Action, 14 pages, dated Jul. 20, 2016.
Chinese Patent Application No. 201380007656.X, Office Action, 19 pages, dated Feb. 3, 2017.
International Application No. PCT/US2012/071160, International Search Report and Written Opinion, 9 pages, dated Apr. 26, 2013.
International Application No. PCT/US2013/025518, International Search Report and Written Opinion, 11 pages, dated Jun. 2, 2013.
International Application No. PCT/US2013/025542, International Search Report and Written Opinion, 11 pages, dated May 30, 2013.
International Application No. PCT/US2013/038993, International Search Report and Written Opinion, 11 pages, dated Sep. 27, 2013.
Office Action for Korean Application No. 10-2014-7024634; dated Oct. 1, 2018; 18 pages.

* cited by examiner

MULTI-SEGMENT TURBOCHARGER BEARING HOUSING AND METHODS THEREFOR

CROSS-REFERENCE TO RELATED APPLICATION(S)

This application is a divisional of U.S. patent application Ser. No. 14/378,981, filed Aug. 15, 2014, which is a 371 National Stage Application of International Patent Application No. PCT/US2013/025518 filed on Feb. 11, 2013, which claims the benefit of U.S. Provisional Application No. 61/600,399, filed on Feb. 17, 2012, the entireties of all of which are incorporated herein by reference.

BACKGROUND

Internal combustion engines must meet ever stricter emissions and efficiency standards demanded by consumers and government regulatory agencies. Accordingly, automotive manufacturers and suppliers expend great effort and capital in researching and developing technology to improve the operation of the internal combustion engine. Turbochargers are one area of engine development that is of particular interest.

Figure 1:
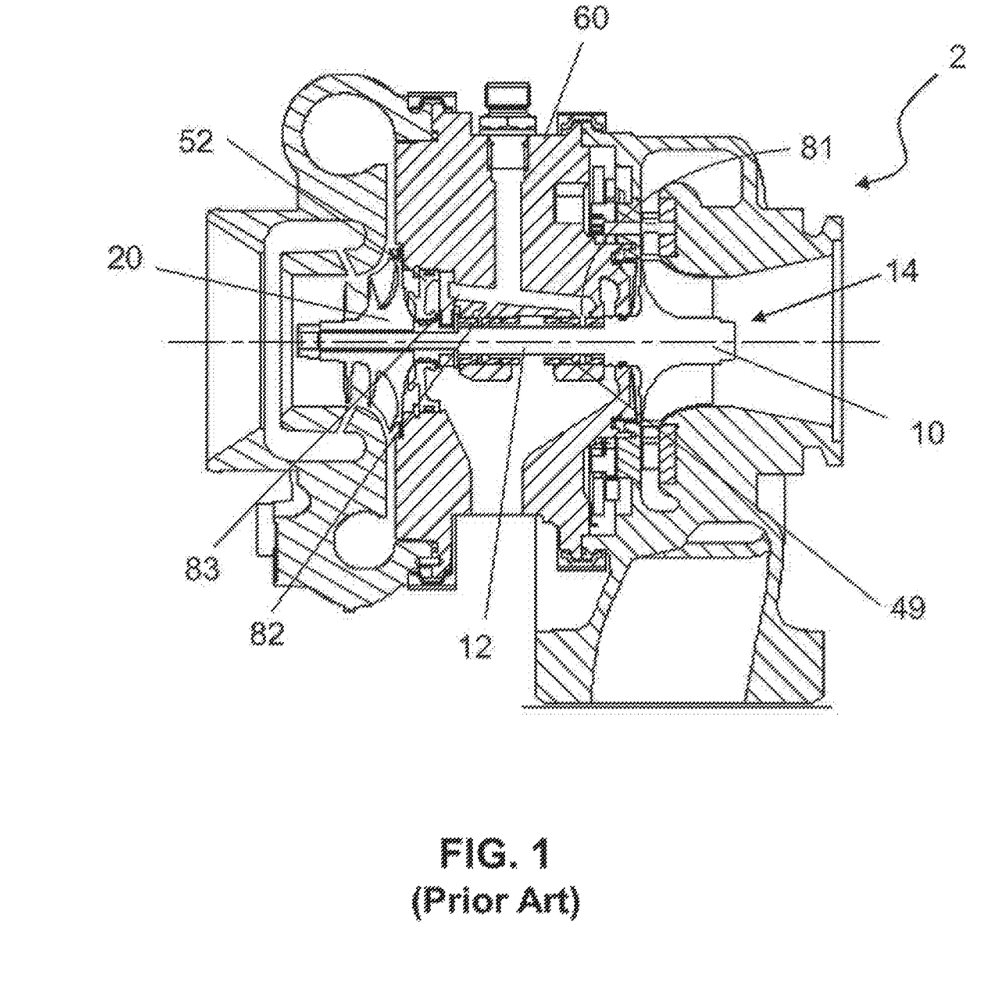
FIG. 1 is a side view in cross-section depicting a turbocharger having a conventional bearing housing.

A turbocharger 2, such as that shown in FIG. 1, uses exhaust gas energy, which would normally be wasted, to drive a turbine wheel 10. The turbine wheel 10 is mounted to a shaft 12 that in turn drives a compressor wheel 20. The turbine wheel 10 converts the heat and kinetic energy of the exhaust into rotational power that drives the compressor wheel 20. The objective of a turbocharger is to improve the engine's volumetric efficiency by increasing the density of the air entering the engine. The compressor draws in ambient air and compresses it into the intake manifold and ultimately the cylinders. Thus, a greater mass of air enters the cylinders on each intake stroke.

When a conventional turbocharger is sized to provide maximum power output for a particular engine, the turbocharger's low-load and transient response performance is generally less than optimal. A turbocharger's compressor performance is dependent on the compressor speed. In order for the compressor to rotate fast enough to provide significant compression, or boost, to the engine, there must be a corresponding increase in exhaust gas flow. However, there is a time delay while the exhaust gases build up and the inertia of the turbine and compressor wheel assembly is overcome. This time delay between the engine's demand for boost and the actual increase in manifold pressure is often referred to as turbo lag.

To help overcome the problems of turbo lag and low-load performance, electrically-assisted turbochargers have been developed. Electrically-assisted turbochargers include an electric motor that is operative to supplement the rotational power derived from the exhaust during low-load and transient conditions. Typically, the motor is connected to the same shaft that carries the turbine and compressor wheels. In some cases, the motor's rotor magnets are carried directly on the shaft, while the stator is contained within the turbocharger's bearing housing.

Referring again to FIGS. 1 and 2, the typical turbocharger bearing housing 60 is cast as a single unitary piece using, for example, a sand cast process that employs various sand-based cores to produce features in the casting. Certain features of the bearing housing, such as air gaps and oil passages 81-83 are difficult, if not impossible, to cast into a single piece housing because the sand-based cores have thin sections and are therefore too delicate to withstand the metal pouring process. Furthermore, various cross passages 81-83 that cannot be cast into the single piece housing must be machined into the housing through the journal bearing bore (77, 78). Accordingly, insertion of the drill used to machine the cross passages is geometrically impeded by the solid structure of the bearing housing. As a result, the bearing and cross-passage configuration is constrained. The drill path for passages 81 and 82 are depicted as 95 and 94, respectively, in FIG. 2.

Figure 2:
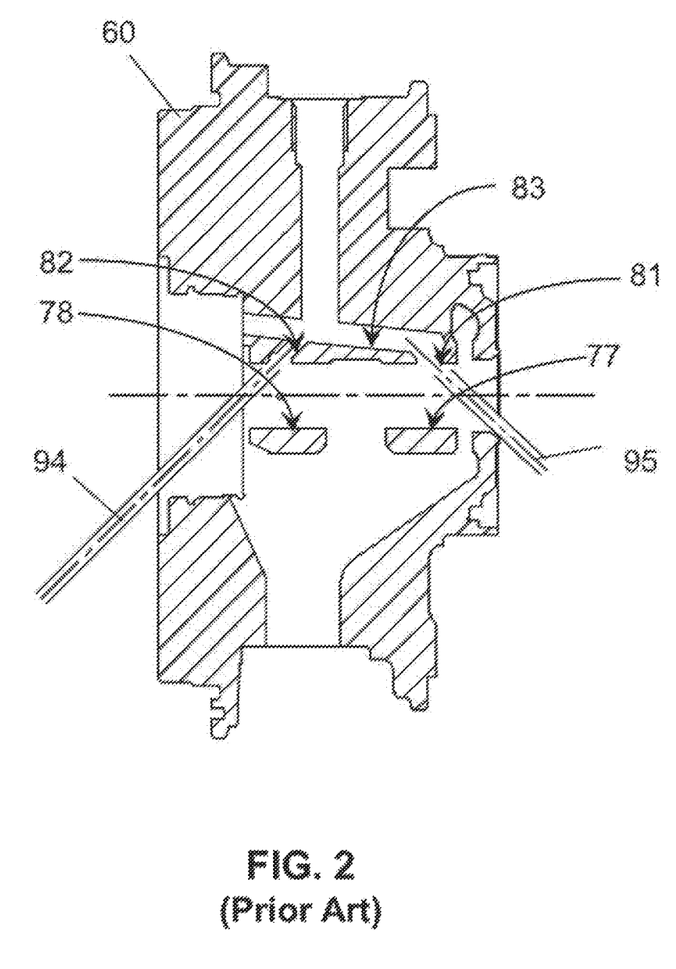
FIG. 2 is a side view in cross-section of the bearing housing shown in FIG. 1.
Figure 3:
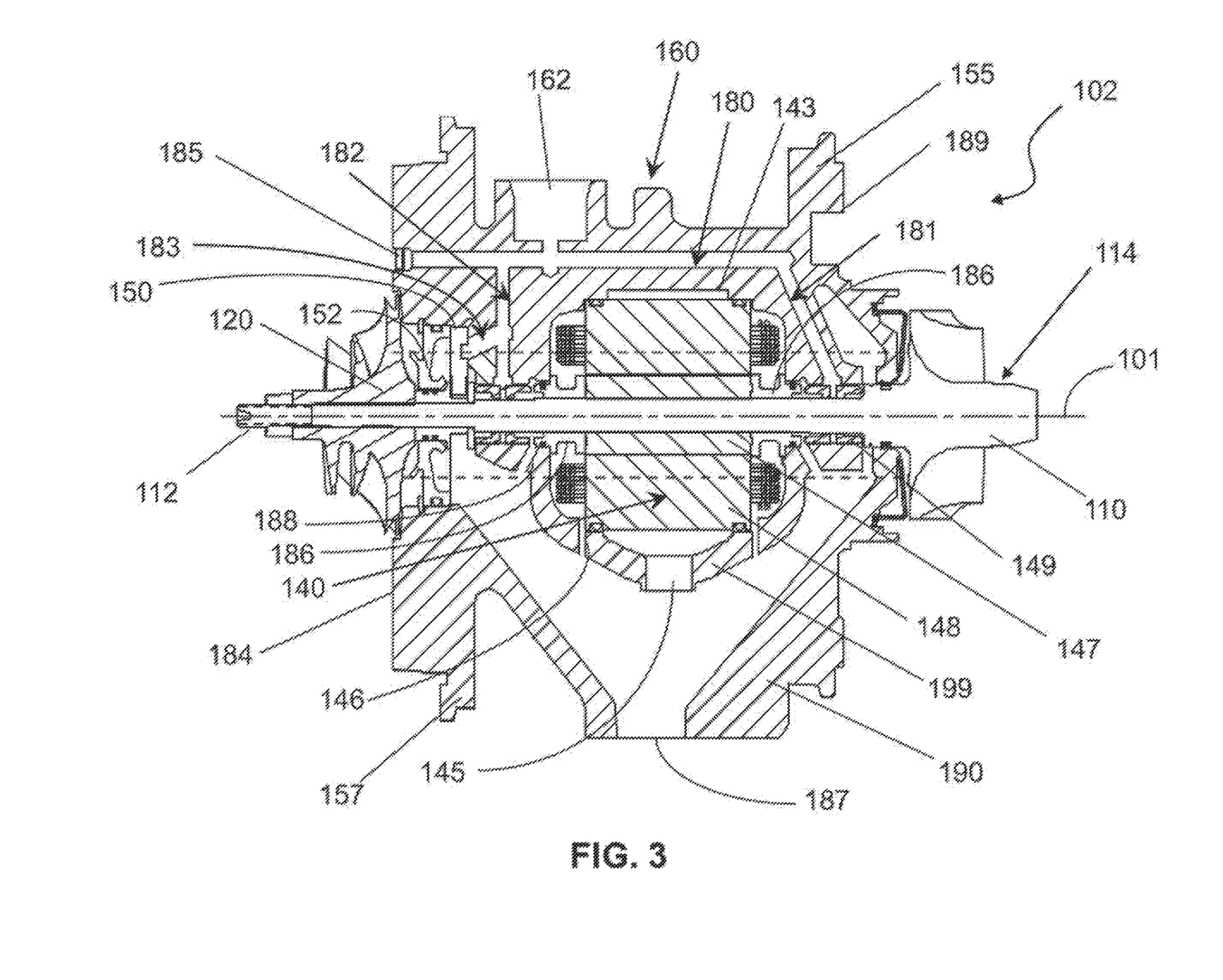
FIG. 3 is a side view in cross-section depicting a turbocharger having a multi-segment bearing housing according to a first exemplary embodiment.

As is well known in the art, the rotating assembly 14 that comprises shaft 12, turbine wheel 10, and compressor wheel 20 should be dynamically balanced in order to achieve the necessary rotational speed without self-destructing at high speeds, often in excess of 200,000 RPM. The rotating assembly 14 should be balanced as an assembled unit, i.e., the compressor wheel 20 and various small parts assembled to the turbine wheel 10 and shaft 12. If the compressor wheel 20 is removed and re-installed, for example, the rotating assembly 14 must be re-balanced, as the alignment of the compressor wheel 20 to the shaft 12, the clamp load of the nut on the compressor wheel, etc., change the balance of the rotating assembly 14. Therefore, with the typical one-piece cylindrical bearing housing 60, this balancing cannot occur until after the rotating assembly 14 is assembled to the bearing housing 60. The design of the rotating assembly 14 is constrained in that it must allow for assembly of the components within the unitary housing 60. This includes bearings 49 and seals 52 as well as the rotating assembly's components.

In the case of an electrically assisted turbocharger, the rotating assembly includes motor components. For example, the rotor is attached to the shaft. Also, the stator surrounds the motor and must be inserted into the bearing bore. It should be appreciated that the assembly of all of these components occurs out of view within the housing.

Although the traditional single piece bearing housing has served the industry well, it does have disadvantages, as explained above. Accordingly, there is still a need for a bearing housing that allows for flexibility in rotor assembly and bearing design. There is a further need for a bearing housing design that facilitates manufacturing, balancing, and testing complex rotor assemblies associated with electrically assisted turbochargers.

SUMMARY

Provided herein is a bearing housing that allows for flexibility in rotor assembly and bearing design. The disclosed bearing housing, turbocharger incorporating the bearing housing, and methods of making and using the same help facilitate manufacturing, balancing, and testing the more complex rotor assemblies associated with electrically assisted turbochargers as well as unassisted turbocharger rotating assemblies.

In an embodiment, the turbocharger comprises a rotating assembly including a compressor wheel and a turbine wheel disposed on opposite ends of a shaft. A bearing housing supports the rotating assembly and comprises at least two segments. Each segment has an opening large enough to radially receive the rotating assembly. The bearing housing segments are fastened together and a flexible seal may be provided between the segments. The bearing housing may house rolling element bearings or journal bearings, for example.

In certain aspects of the technology described herein, the bearing housing is split axially into an upper segment and a lower segment. Alternatively, the bearing housing is split axially into a left segment and a right segment. In other aspects of the technology, the turbocharger may further comprise an electric motor stator disposed in the bearing housing. The bearing housing may also include a defined passageway extending around the stator and configured to receive a liquid.

In another embodiment, the turbocharger comprises a rotating assembly including a rotor mounted on a shaft and a compressor wheel and a turbine wheel disposed on opposite ends of the shaft. A bearing housing supports the rotating assembly and comprises upper and lower segments. Each segment has an opening large enough to radially receive the rotating assembly. A stator is disposed in the bearing housing and around the rotor.

Also contemplated, is a method for enclosing a rotating assembly of a turbocharger. The method comprises providing at least two bearing housing segments which together form a bearing housing including a bearing bore and an insert bore; machining complementary mating faces of the segments; machining features as required for alignment and fastening of the segments to each other; machining the bearing bore and the insert bore; machining oil feed passages and oil drain features into at least one segment, wherein at least one oil feed bore is drilled from the radially inner surface of the corresponding bearing housing segment; balancing a rotating assembly; installing the rotating assembly into at least one of the bearing housing segments; and joining the segments together to enclose the rotating assembly.

The at least two bearing housing segments may be provided by separately casting each segment. Alternatively, the at least two bearing housing segments are provided by casting a unitary bearing housing and subsequently cutting, or splitting, the unitary bearing housing into the at least two bearing housing segments. The segments are assembled to each other before the step of machining the bearing bore and the insert bore.

These and other aspects of the multi-segment bearing housing will be apparent after consideration of the Detailed Description and Figures herein. It is to be understood, however, that the scope of the invention shall be determined by the claims as issued and not by whether given subject matter addresses any or all issues noted in the background or includes any features or aspects recited in this summary.

BRIEF DESCRIPTION OF THE DRAWINGS

Non-limiting and non-exhaustive embodiments of the multi-segment bearing housing, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the technology of the application. However, embodiments may be implemented in many different forms and should not be construed as being limited to the embodiments set forth herein. The following detailed description is, therefore, not to be taken in a limiting sense.

As depicted in FIGS. 3-6, the bearing housing 160 is split into a pair of segments, axially, along the centerline axis 101 of the turbocharger 102. In this case, the upper segment 189 of the bearing housing houses all of the pressurized oil system elements. The oil bore 181 for the turbine-end journal bearing oil feed can be drilled nearly perpendicular to the axis 101, as can the oil bore 182 for the compressor-end journal bearing oil feed. A connecting bore 180 is drilled from the compressor diffuser face 184 and then sealed with an expansion plug 185. This connecting bore is drilled such that it intersects the oil inlet 162 and is used as a conduit to fluidly connect the bearing feed oil bores (181, 182) with the oil inlet 162. A short oil bore 183 is drilled from the thrust bearing face 185 to intersect the compressor-end journal bearing feed bore 182 to fluidly connect the thrust bearing (after assembly) to the oil inlet 162. This removes the geometric constraint of the thrust bearing oil feed bore 183 feeding the journal bearing oil feed bores (181, 182) and thus allows for a smaller diameter thrust bearing 150 and a resulting smaller diameter insert 152 as the insert bore 179 (see FIG. 4) no longer has to cater to the alignment of the compressor-end oil feed journal bore centerline.

The more perpendicular (i.e., closer to 90 .degree.) the oil bores (181, 182) are drilled with respect to the centerline axis 101; the less complicated the drilling operation. Free access to the journal bearing provides more freedom for the placement of the drillings and thus the axial placement of the journal bearings. In this embodiment, the size of the thrust bearing and the position of the journal bearings are similar to that of a conventional turbocharger; however, the thrust bearing could be made smaller in diameter to take advantage of the freedom of the placement and axis of the thrust bearing oil drilling 183 provided by the two-piece bearing housing design.

In this embodiment, a cavity 141 is provided in the upper and lower segments (189, 190) of the bearing housing for the electric motor 140. The motor includes a rotor 147 attached to the shaft 112 and a stator 148 disposed in cavity 141. In this case, the segments comprise upper and lower halves; however, the halves could be left and right. Furthermore, the segments may be divided in different portions. For example, the segments could be divided into ¼ and ¾ or ⅓ and ⅔ segments. Among other suitable processes, it is contemplated that cavity 141 may be formed by an electrical discharge machining (EDM) process as is known in the art. In particular, cavity 141 may be formed by a graphite slug EDM process.

Figure 4:
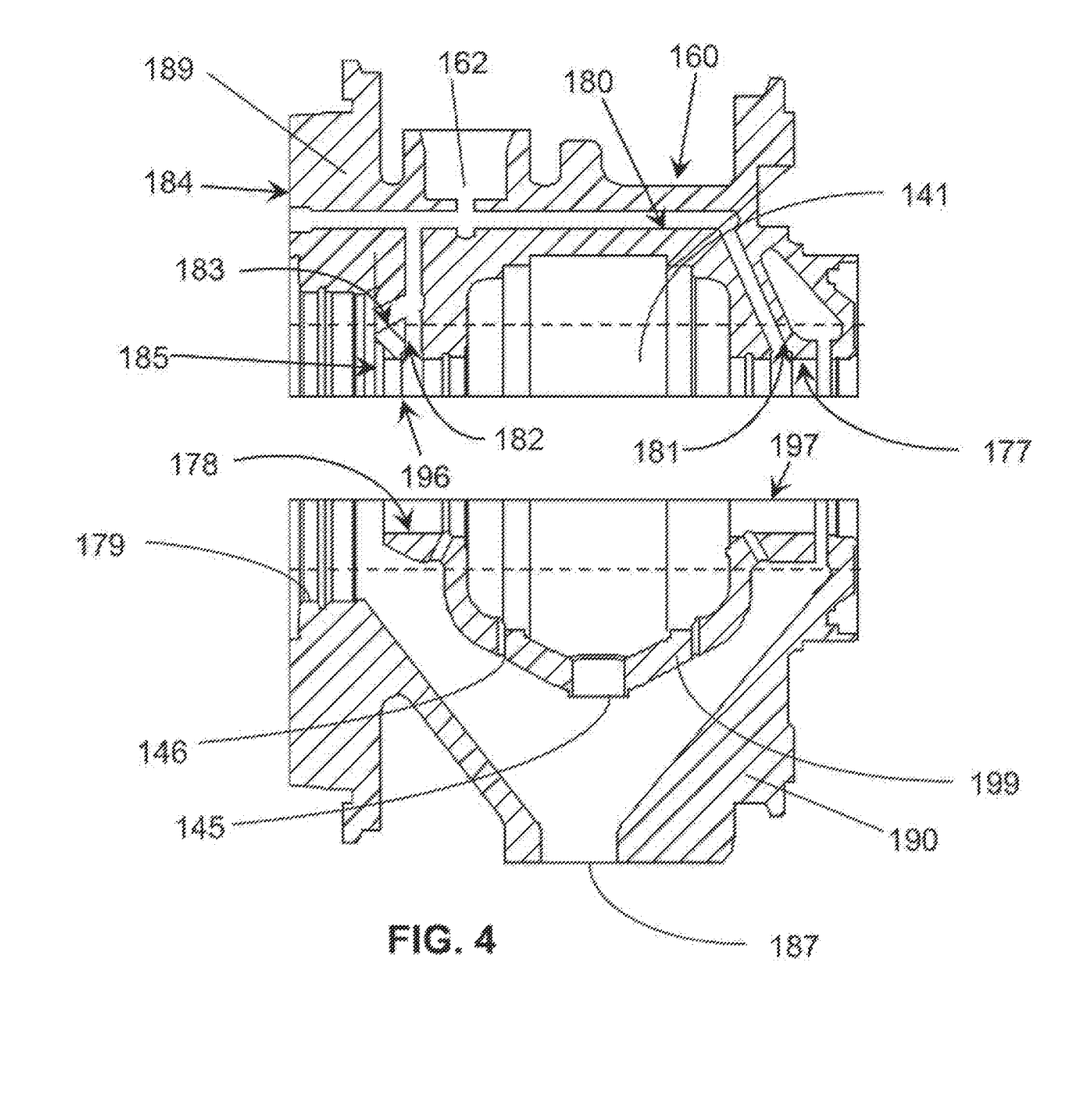
FIG. 4 is an exploded side view in cross-section of the bearing housing shown in FIG. 3.

As shown in FIG. 4, the lower segment 190 of the bearing housing matingly engages the upper segment 189 to complete the bearing housing 160. Oil drain features are provided in the lower segment of the bearing housing. An inner shell 199 is provided to temporarily retain oil around the outside of the electric motor 140 in a defined passageway, such as for example annulus 143 that extends around the stator 148. The purpose of this shell is to keep oil in contact with the stator 148 for cooling. The drain 145 for this cooling oil may be a bore in the shell 199, which allows oil to flow from the annulus formed by the stator 148 of the electric motor 140, and the bearing shell 199 (see FIG. 3) to the major bearing housing oil drain 187, which is fluidly connected to the engine crankcase. A plurality of oil weep holes 146, allow the egress of any oil which escapes the electric motor oil containment system or the shaft seal collars 186. A plurality of drain holes 188 near the intersection of the electric motor shell 199 and the lower journal bearing support are provided to allow escape of oil from the journal bearings 149.

Figure 5:
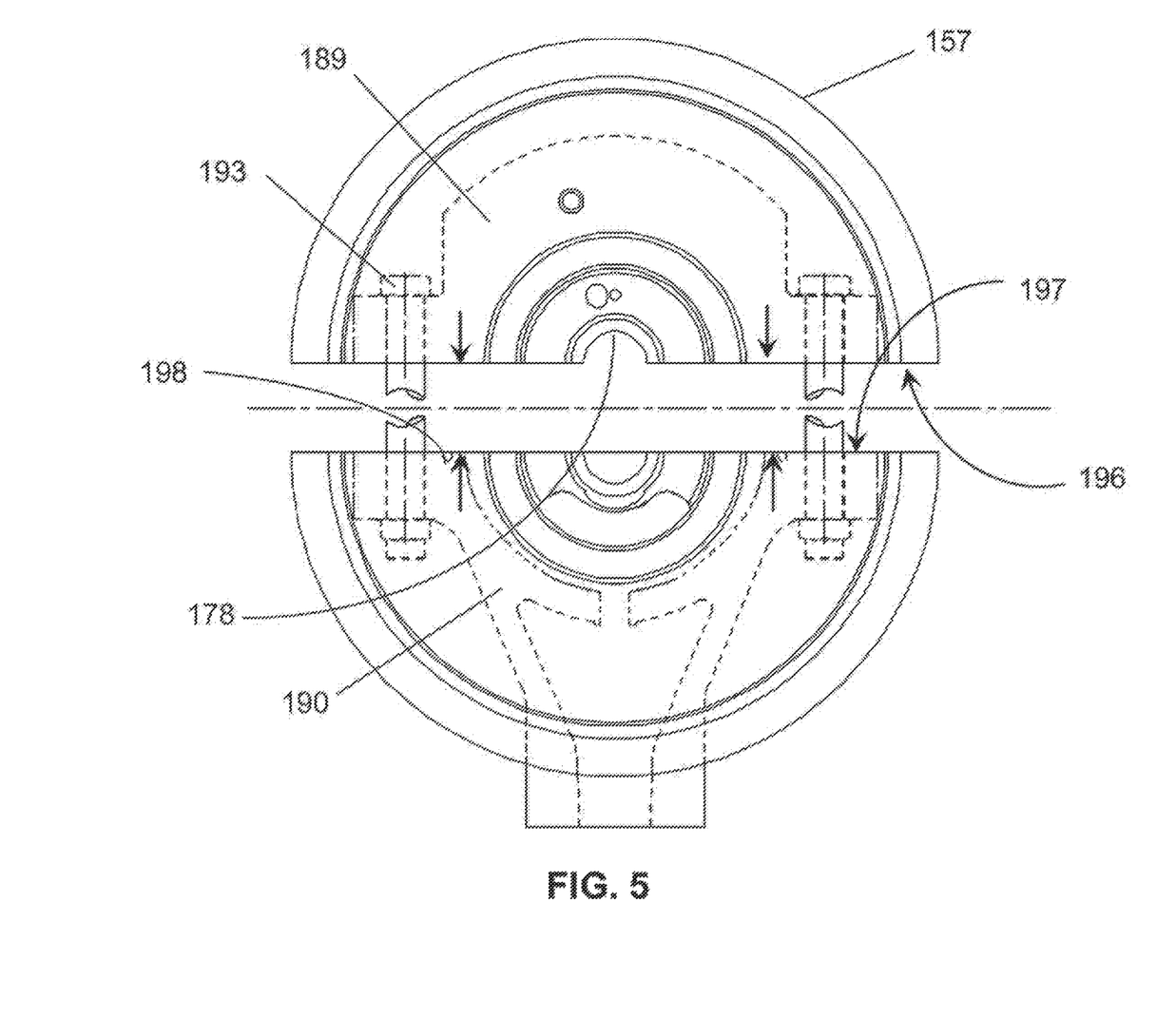
FIG. 5 depicts an end-view of the bearing housing shown in FIGS. 3 and 4.
Figure 6:
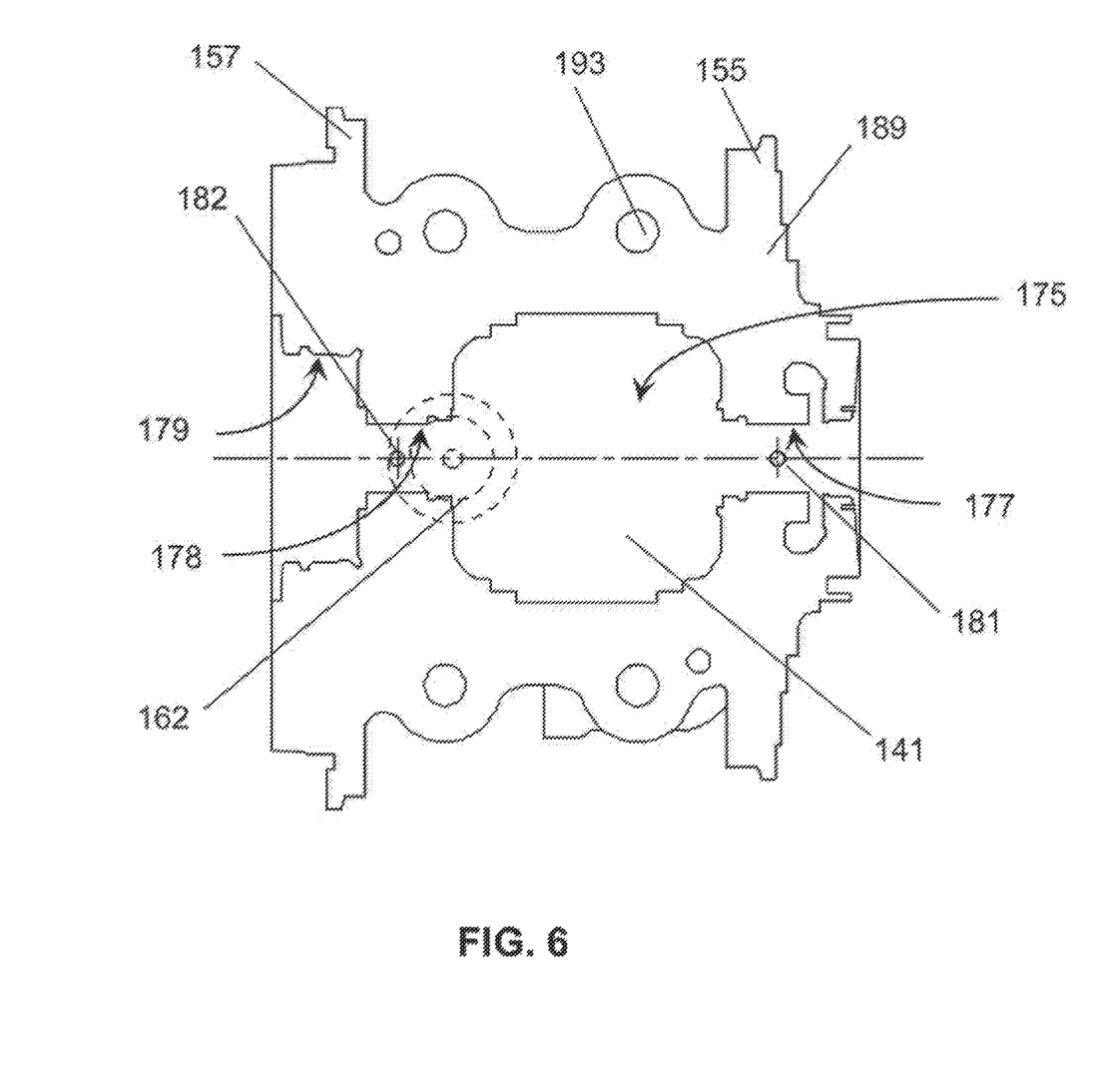
FIG. 6 depicts a bottom plan view of the top segment of the bearing housing shown in FIGS. 3-5.

The upper and lower segments (189, 190) of the bearing housing are mechanically fastened together during the assembly process. The segments may be fastened together by any mechanical or chemical means such as retaining bolts, rivets, peening, welding, gluing. As depicted in FIG. 5, a plurality of bolts 193 clamp the top segment 189 to the lower segment 190. These bolts can be fastened into tapped holes or can pass through clean bores and threaded into nuts. The clamp load supplied by these retaining bolts compresses a seal gasket to provide oil and gas sealing between the inside of the bearing housing and the outside of the bearing housing. The sealing gasket may be an impregnated graphite sealing medium, such as a grafoil flexible gasket, but it could also be an embossed flat shim type gasket. the gasket is not specifically shown in the figures, but gaskets are generally understood in the art. Alternatively, or in addition to a gasket, sealing compound may be applied to the sealing surfaces. A groove 198 is provided in the bottom segment 190 for the raised part of the seal. As depicted in FIG. 5, the groove 198 for the gasket is in the bottom segment 190, but the groove 198 also could be in the top segment 189 (or both) with no difference in function.

The bearing housing upper and lower halves may be cast separately, and then the mating surfaces and functional surfaces are machined to the necessary tolerances and to form the necessary bores. In an embodiment, the process for machining the illustrated embodiment of the bearing housing comprises: machining the complementary centerline faces (196, 197) of respectively the upper segment and lower segment of the bearing housing casting; machining the mounting and alignment holes; drilling the oil feed bores and oil drain features; EDM cavity 141; joining the segments together; and finish machining the diametrical features, such as for example, bearing bore, insert bore, veeband flanges (155, 157) (or bolt and clamp features if the bearing housing to end-housing joints are bolts and clamp plates). Alternatively, the housing may be cast as one and subsequently cut, or split, into segments. In the case of a single housing subsequently split, the casing may be cut using a wire EDM process as known in the art.

In this embodiment, the rotating assembly 114 can be assembled with full sight of all of the components outside of the bearing housing. Further, the rotating assembly can be balanced and tested in a fixture so that it requires no further balancing or testing after assembly into the bearing housing. The fixture can be used for any turbocharger in the same family (i.e., using the same rotor assembly) rather than having to have specific balance tooling for each design of the bearing housing. Using a fixture in which the pre-assembled rotor can be balanced, without requiring dismantling and reassembly into a bearing housing followed by post-assembly balancing, opens up the opportunity to remove balance stock from the back of the wheels should balancing require that material removal. Once the rotating assembly 114 has been assembled, balanced, and tested it can be installed into opening 175 of lower segment 189, for example (see FIG. 6).

Figure 7:
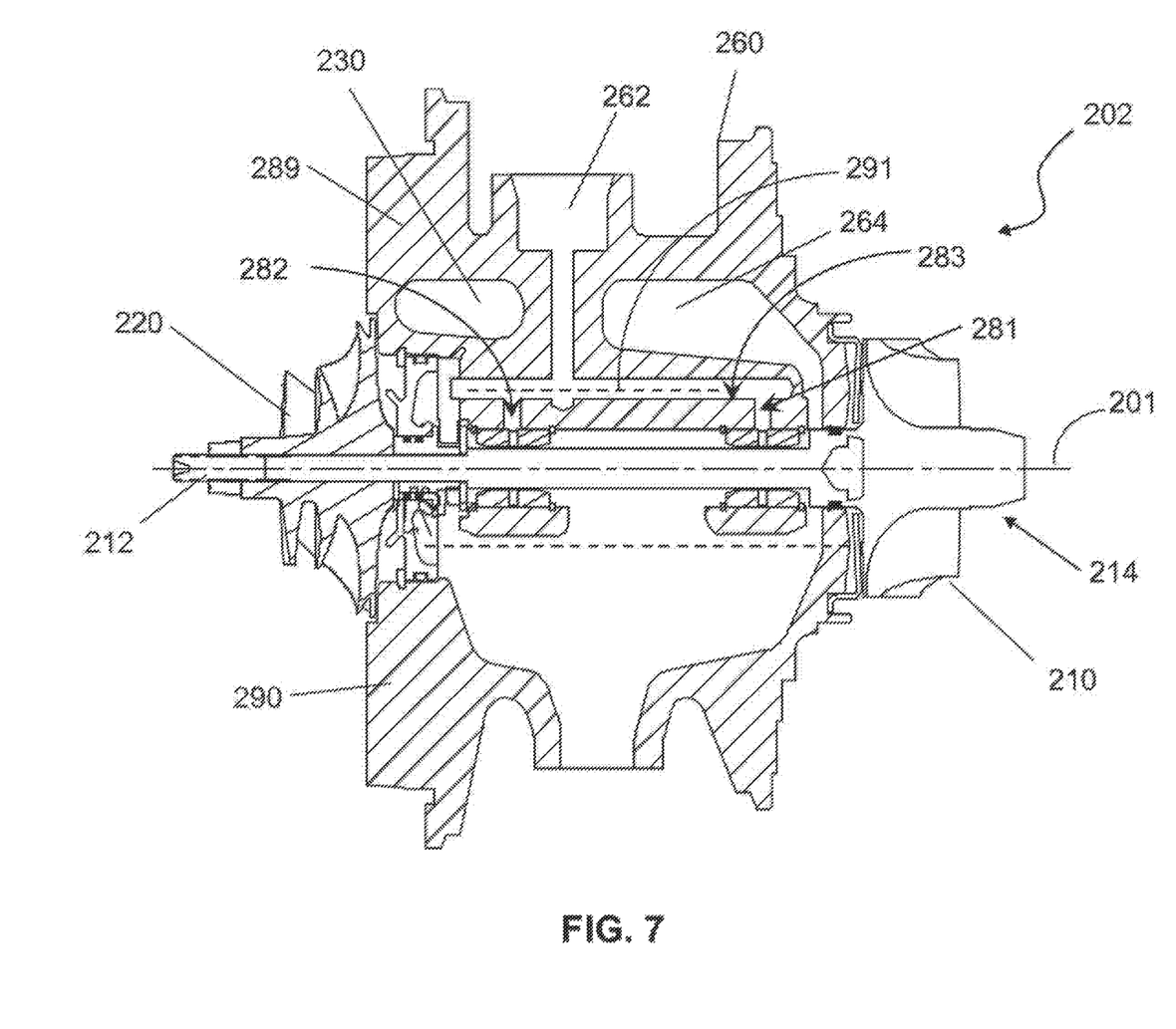
FIG. 7 is a side view in cross-section depicting a turbocharger having a multi-segment bearing housing according to a second exemplary embodiment.

FIG. 7 illustrates a bearing housing according to a second exemplary embodiment. Bearing housing 260 comprises upper 289 and lower 290 segments, as in the first embodiment. The bearing design is similar to that of a typical turbocharger, but the thrust bearing oil feed bore 283 becomes the primary non-vertical oil feed bore, and it is intersected by journal bearing bores (281, 282) and the extension of the oil inlet 262. As explained above, the option of drilling the journal bearing bores 281, 282 from the "inside" of the bearing housing removes the constraints caused by having to drill the journal bearing oil feeds from the ends of the conventional one piece bearing housing, so the oil can be fed closer to the shaft whereby the thrust bearing and insert can be much smaller (in diameter) than that of a typical single piece bearing housing. As depicted in FIG. 7, both the turbine-end air gallery 264 and the compressor-end air gallery 230 are much larger than possible with a single piece bearing housing as the cores can be more robustly supported. This can produce a bearing housing with less mass of cast iron and with greater air gaps to minimize the conductive flow of heat from the turbine housing to the bearings and compressor stage. An important gain in manufacturing efficiency of the second embodiment is that the rotating assembly can be assembled with full sight of all of the components (which are no longer hidden within a unitary bearing housing), and the rotating assembly can be balanced in a fixture which can be used for any turbocharger in the same family rather than having to have specific balance tooling for each design of bearing housing. This also opens up the opportunity to remove balance stock from the back of the wheels should balancing require that material be removed.

Figure 8:
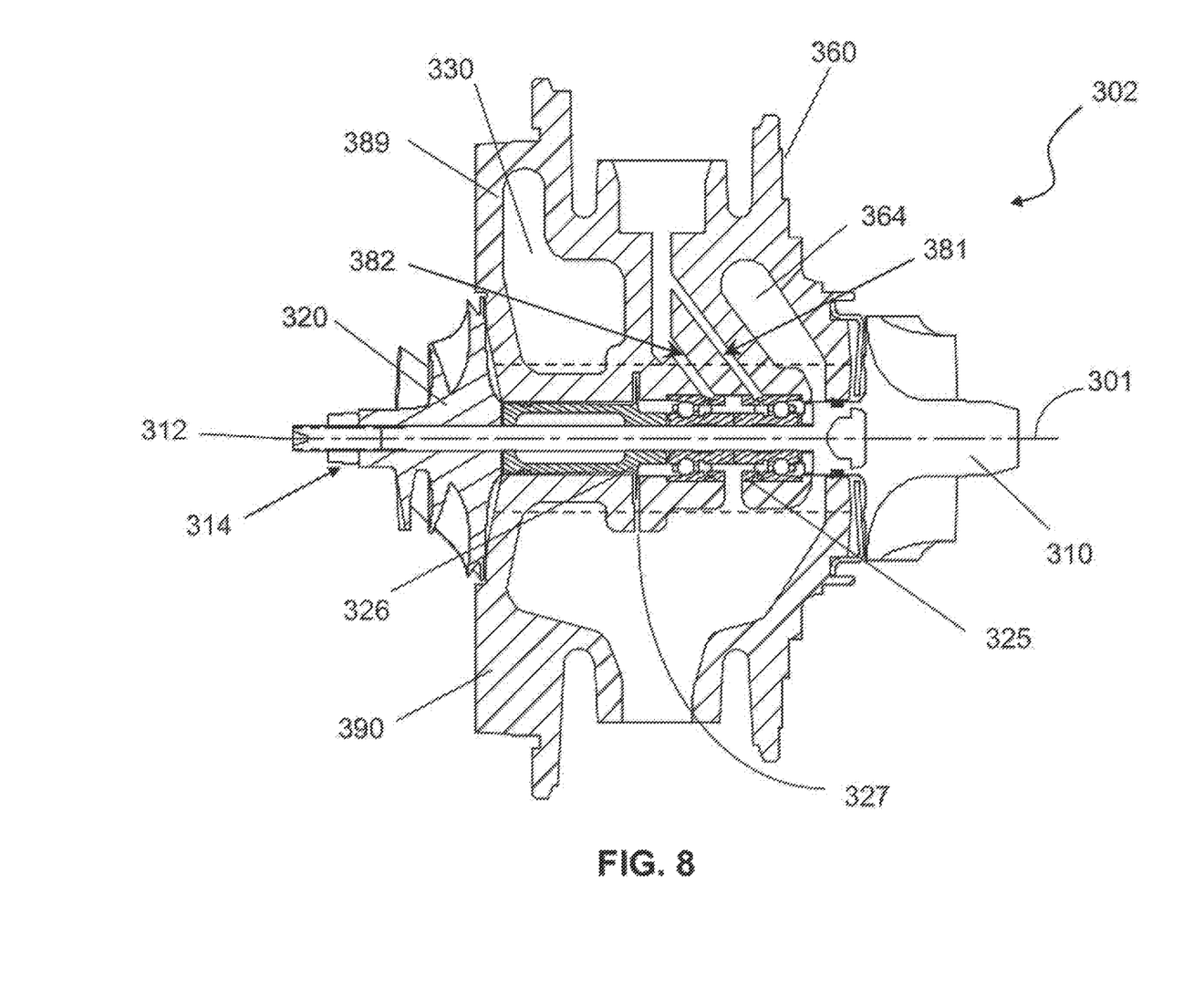
FIG. 8 is a side view in cross-section depicting a turbocharger having a multi-segment bearing housing according to a third exemplary embodiment.
Figure 9:
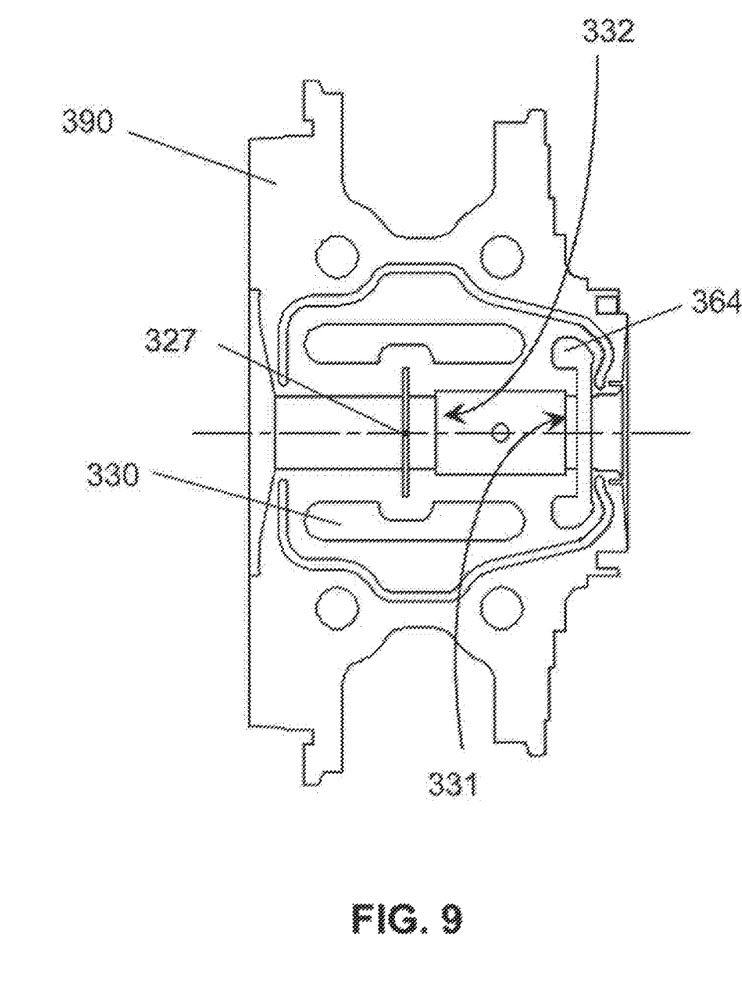
FIG. 9 depicts a top plan view of the bottom segment of the bearing housing shown in FIG. 8.

In a third embodiment, as depicted in FIGS. 8 and 9, a rolling element bearing 325 (REB) is used to support and control the rotating assembly 314. As with the second embodiment, it becomes possible to reduce heat conductance from the turbine housing into the bearing housing 360. This is because the air gallery cores (364, 330) can be much larger and more robustly supported the oil feed drilled bores (381, 382) can be more easily drilled with no horizontal connecting bore even required. It should be appreciated that the axial and rotational constraint of the REB can be machined into the bearing housing segments rather than be additional parts. The rotational constraint can be easily supplied as long as the REB cartridge outer shape has some anti-rotational feature, such as a geometric feature (for example a "flat" machined into the outer surface of the REB outer race) which fits to a complementary feature in the bearing housing. In this case, the REB outer race has a flat machined into one of the axially facing ends. The bearing housing has a recess with an abutment (331 or 332) in the end complementary to the anti-rotational feature on the REB outer race (see FIG. 9). When the rotating assembly is fitted to the segment of the bearing housing with the anti-rotational feature, the two anti-rotational features mesh and the REB is allowed to float in its oil film, but is constrained from rotation.

The axial constraint is managed in a similar manner. The axial ends of the outer race or REB are axially constrained by abutments (331, 332) in the upper and/or lower bearing housing cavities. In both the axial and rotational constraints of the third embodiment of the invention, no additional components are required to provide the axial and rotational constraint. A flinger 326 is provided to impede the flow of oil from the bearings to the compressor wheel. A cavity for the flinger has an oil drain 327 in the lower segment to drain any oil flung off the oil flinger.

Methods relating to the above described multi-segment bearing housing and turbocharger are also contemplated. The methods thus encompass the steps inherent in the above described structures and operation thereof. In an exemplary embodiment, the method may comprise providing at least two bearing housing segments which together form a bearing housing including a bearing bore and an insert bore; machining complementary mating faces of the segments; machining features as required for alignment and fastening of the segments to each other; machining the bearing bore and the insert bore; machining oil feed passages and oil drain features into at least one segment, wherein at least one oil feed bore is drilled from the radially inner surface of the corresponding bearing housing segment; balancing a rotating assembly; installing the rotating assembly into at least one of the bearing housing segments; and joining the segments together to enclose the rotating assembly.

In an another exemplary embodiment, the method may comprise component balancing the compressor; component balancing the turbine; assembling the rotor, bearings, and collars to the turbine; balancing the rotor, bearings, collars, and turbine sub-assembly; installing the sub-assembly into at least one of the bearing housing segments; and joining the segments together to enclose the sub-assembly; assembling the compressor wheel to the shaft; and high-speed balancing the turbocharger.

The at least two bearing housing segments may be provided by separately casting each segment. Alternatively, the at least two bearing housing segments are provided by casting a unitary bearing housing and subsequently cutting, or splitting, the unitary bearing housing into the at least two bearing housing segments. The segments are assembled to each other before the step of machining the bearing bore and the insert bore.

Accordingly, the multi-segment bearing housing, turbocharger incorporating the same, and methods therefor have been described with some degree of particularity directed to the exemplary embodiments. It should be appreciated; however, that the present invention is defined by the following claims construed in light of the prior art so that modifications or changes may be made to the exemplary embodiments without departing from the inventive concepts contained herein.

We claim:

1. A method for enclosing a rotating assembly (114, 214, 314) of a turbocharger (102, 202, 302), the method comprising:
   providing at least two bearing housing segments (189, 190; 289, 290; 389, 390) which together form a bearing housing (160, 260, 360) including a bearing bore (177, 178) and an insert bore (179);
   machining complementary mating faces (196, 197) of the segments;
   machining features (193) as required for alignment and fastening of the segments to each other;
   machining the bearing bore (177, 178) and the insert bore (179);
   machining oil feed passages (181-183) and oil drain features (145, 187) into at least one segment, wherein at least one oil feed bore (181, 182) is drilled from a radially inner surface of the corresponding bearing housing segment;
   balancing a rotating assembly (114, 214, 314);
   installing the rotating assembly (114, 214, 314) into at least one of the bearing housing segments (189, 190; 289, 290; 389, 390); and
   joining the segments together to enclose the rotating assembly (114, 214, 314).

2. The method of claim 1, wherein the rotating assembly (114) includes a rotor (147) of an electric motor, and wherein a corresponding stator (148) is housed in the bearing housing (160).

3. The method of claim 1, wherein the at least two bearing housing segments (189, 190; 289, 290; 389, 390) are provided by separately casting each segment.

4. The method of claim 1, wherein the at least two bearing housing segments are provided by casting a unitary bearing housing and subsequently cutting the unitary bearing housing into the at least two bearing housing segments (189, 190; 289, 290; 389, 390).

5. The method of claim 4, wherein the unitary bearing housing is cut axially parallel with an axis of the bearing bore.

6. The method of claim 1, wherein the segments (189, 190; 289, 290; 389, 390) are assembled to each other before the step of machining the bearing bore (177, 178) and the insert bore (179).

7. The method of claim 1, wherein the complementary mating faces (196, 197) of the segments are parallel with an axis of the bearing bore.

8. The method of claim 1, further comprising coupling the bearing housing segments (189, 190; 289, 290; 389, 390) with fasteners (193).

9. The method of claim 1, further comprising providing a flexible seal between the bearing housing segments (189, 190; 289, 290; 389, 390).

10. The method of claim 1, wherein the rotating assembly (114) includes a rotor (147) mounted on a shaft (112) and a compressor wheel (120) and a turbine wheel (110) disposed on opposite ends of the shaft (112).

11. A method for enclosing a rotating assembly (114, 214, 314) of a turbocharger (102, 202, 302), the method comprising:
   providing at least two bearing housing segments (189, 190; 289, 290; 389, 390) which together form a bearing housing (160, 260, 360) including a bearing bore (177, 178) and an insert bore (179);
   machining complementary mating faces (196, 197) of the segments, wherein the complementary mating faces (196, 197) of the segments are parallel with an axis of the bearing bore;
   machining the bearing bore (177, 178) and the insert bore (179);
   machining oil feed passages (181-183) and oil drain features (145, 187) into at least one segment, wherein at least one oil feed bore (181, 182) is drilled from a radially inner surface of the corresponding bearing housing segment;
   balancing a rotating assembly (114, 214, 314) including a shaft (112), a rotor (147) of an electric motor, and a compressor wheel (120) and a turbine wheel (110) disposed on opposite ends of the shaft (112);

installing the rotating assembly (114, 214, 314) into at least one of the bearing housing segments (189, 190; 289, 290; 389, 390); and joining the segments together to enclose the rotating assembly (114, 214, 314).

12. The method of claim 11, wherein a corresponding stator (148) is housed in the bearing housing (160).

13. The method of claim 11, wherein the at least two bearing housing segments (189, 190; 289, 290; 389, 390) are provided by separately casting each segment.

14. The method of claim 11, wherein the at least two bearing housing segments are provided by casting a unitary bearing housing and subsequently cutting the unitary bearing housing into the at least two bearing housing segments (189, 190; 289, 290; 389, 390).

15. The method of claim 11, wherein the segments (189, 190; 289, 290; 389, 390) are assembled to each other before the step of machining the bearing bore (177, 178) and the insert bore (179).

16. The method of claim 11, further comprising coupling the bearing housing segments (189, 190; 289, 290; 389, 390) with fasteners (193).

17. The method of claim 11, further comprising providing a flexible seal between the bearing housing segments (189, 190; 289, 290; 389, 390).

\* \* \* \* \*